Dec. 12, 1933.  W. H. RADFORD  1,938,977
SHAFT BOOT
Original Filed March 6, 1929
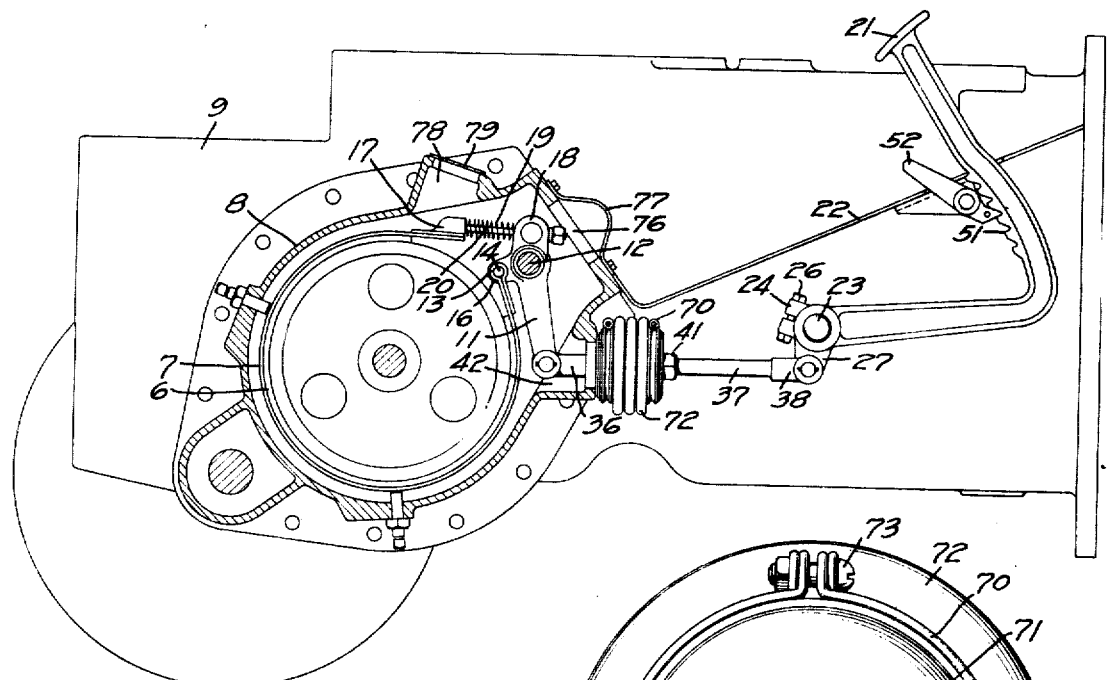
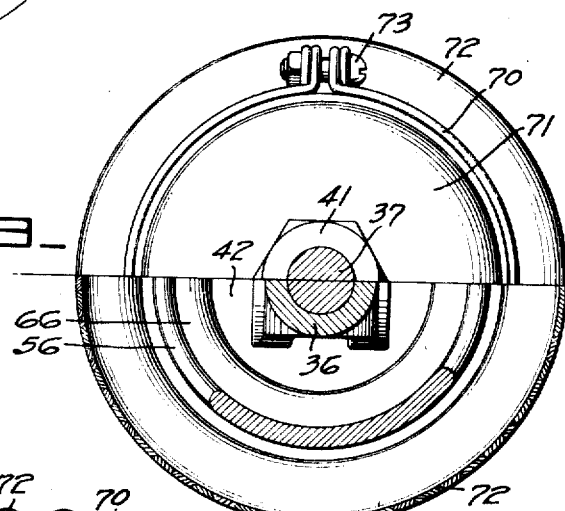
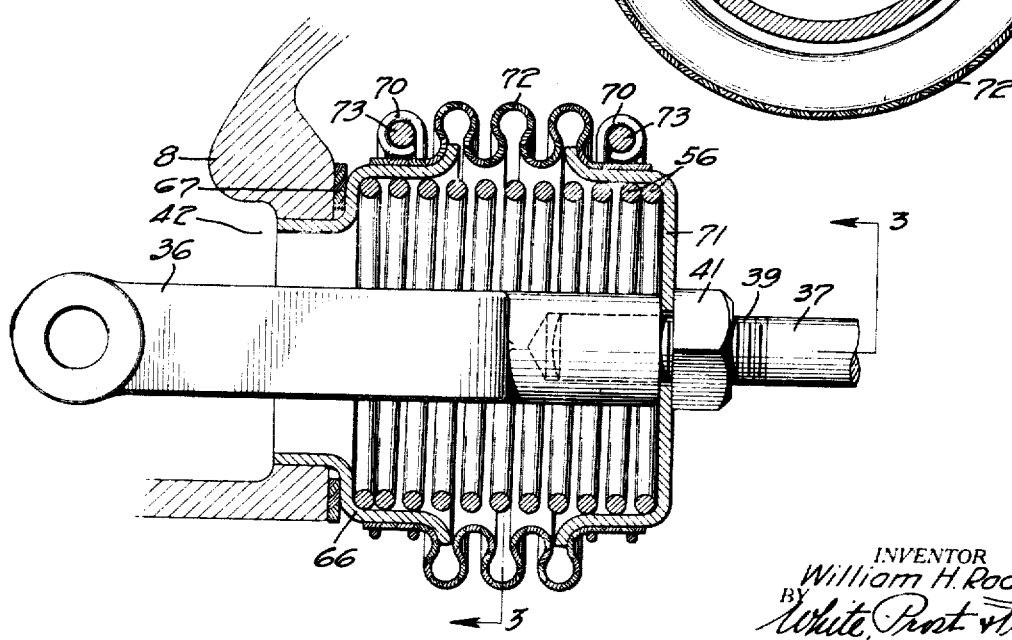
INVENTOR
*William H. Radford*
BY *White, Prost & Fryer*
ATTORNEYS Patented Dec. 12, 1933

1,938,977

UNITED STATES PATENT OFFICE 1,938,977

SHAFT BOOT

William H. Radford, San Leandro, Calif., assignor to Caterpillar Tractor Co., San Leandro, Calif., a corporation of California Application March 6, 1929, Serial No. 344,703
Renewed November 27, 1929

14 Claims. (Cl. 74—81)

Although the shaft boot of my invention can be employed in numerous different environments, it is particularly adapted for use on tractors, to seal an opening through which an actuating member is operable, and it is in this connection that I shall describe it herein.

Tractors are used for various purposes under all conditions of operation. It is expedient, therefore, that they be ruggedly constructed and, in addition, so manufactured that they are sealed against the entrance of any foreign matter for damages of a serious nature can result from the entrance of dust or water into the various mechanisms. In certain standard makes of tractors now sold in the markets of the world the steering of the tractor is secured by a suitable variation in the power applied to each of the driving means upon opposite sides of the tractor. To secure quick turning and to facilitate the handling of the tractor it is usual to provide, in combination with each of the driving means, a means for securing a positive stopping of the tractor.

One convenient method of accomplishing this is to provide a brake for imposing the desired frictional resistance on the tractive means. The brake is customarily enclosed and is actuated by an operating shaft piercing the enclosure.

It is therefore an object of my invention to provide an improved device for sealing an opening in a tractor.

Another object of the device of my invention is to provide a novel means for enclosing an operating mechanism.

The invention possesses other advantageous features, some of which with the foregoing will bet set forth at length in the following description where I shall outline in full that form of the shaft boot of my invention, which I have selected for illustration in the drawing accompanying and forming part of the present specification. In said drawing I have shown one form of the shaft boot embodying my invention, but it is to be understood that I do not limit myself to such form since the invention, as set forth in the claims, may be embodied in a plurality of forms.

In the drawing to which I have made reference, Figure 1 is a side elevation of a standard tractor transmission.

Figure 2 is a cross section through the device of my invention.

Figure 3 is an end elevation along the section line 3—3 of Figure 2.

The shaft boot of my invention preferably comprises a pair of spaced members supported by an apertured housing and an actuating shaft, with a spring confined between the pair of members and enclosed by an extensible sleeve spanning the space between the members.

As shown in Figure 1 of the drawing, a brake drum 6, is usually provided and is acted upon by a brake band 7 of the customary type. These are preferably enclosed in a suitable housing 8 which is attached to a body 9 of the tractor. This housing is symmetrical about its major axis and is thus adapted to be readily used as either a right or left hand unit.

The brake band 7 is preferably attached to a lever 11, which is pivoted about a fixed pin 12. An eye 13 formed upon one end of the brake band surrounds a pin 14 held in an arm 16 of the lever 11. At its other end the band carries a lug 17 which is extended by a lug bolt 20 piercing an arm 18 of the lever 11. The band is normally held in released position by a spring 19 encompassing the lug bolt and abutting the lug 17 and the arm 18. The lever 11 is expediently operated by means of a brake pedal 21 passing through a floor board 22 and pivoted about the axis of a rod 23. The brake pedal is preferably clamped on the rod 23 by a clevis 24 and a bolt 26 and is integral with a lever arm 27. To secure the brake pedal actively to the brake band a yoke 36 is usually attached to the lever 11 and connects with a shaft 37 having a clevis 38 engaging the lever arm 27. To render the linkage adjustable, the connection of the shaft 37 to the yoke 36 includes a threaded portion 39. This adjustment is assured by means of a lock nut 41. The yoke 36, in the design illustrated, lies within and is operable through an opening 42 in the housing 8.

Depression of the brake pedal by the foot of the operator causes the lever arm 27 to move toward the brake drum and translates the shaft 37 and yoke 36 in the same direction. The lever 11, being connected to the yoke, is also moved toward the drum and consequently a tightening of the brake band results. To maintain the brake in any tightened position, the brake pedal is usually provided with a series of serrations 51, which can be engaged by a dog 52 suitably attached to the floor board 22 of the tractor.

To return the brake to its normal position a spring 56 is usually provided. This spring in the usual installation is directly subjected to the action of the elements or conditions under which the tractor is operating. The collection of mud and ice on the spring, at all times undesirable, often becomes so pronounced as to render the braking mechanism inoperable.

To protect the spring and to seal the housing wherein the brake is disposed I have, in accordance with my invention, provided a closure to encase the spring and seal the opening in the housing. Preferably I have manufactured this closure of a cup shaped member 66 which is usually inserted into and engages the surface of the opening 42 in the housing 8. To seal the space between the member 66 and the housing and to prevent the entrance therethrough of any foreign matter, I have expediently disposed between the cup member and the housing a washer 67 which may be of any suitable material such as felt. Another cup member 71 opposite to the cup member 66 is retained upon the shaft and against the yoke 36 by the lock nut 41. These cup members serve to confine and retain the spring 56 and to provide surfaces against which it may act.

During movement of the brake pedal 21 between disengaged position and engaged position, the yoke 36 swings through a lesser vertical distance than does the clevis 38, giving rise to considerable lateral movement of the shaft 37 in addition to its axial movement. To effect a tight seal even under these onerous conditions I have provided a boot 72, preferably of leather or other suitable material, and which is usually provided with a series of convolutions so that it is both extensible and flexible. This boot or sleeve is adapted to cover the spring 56 and engage the cup members. The sleeve may be suitably retained upon the cup members by any convenient means and I have expediently used clamps 70 made out of a heavy gauge wire which are drawn together by means of bolts 73. Even though the boot is quite flexible it is maintained by the spring substantially in position between the cup members thus avoiding possible damaging of the boot and the unsealing of the housing.

The major adjustment of the brake is readily effected without disturbing the seal by removing the clevis 38 from engagement with the lever arm 27, loosening the lock nut 41 on the shaft 37 and varying the distance between the yoke 36 and the clevis by screwing the shaft into or out of the yoke. Even though the distance between the housing 8 and the furthermost cup member 71 is varied considerably by such adjustment, it is not necessary to disturb the housing seal. The brake is readily adjustable through a port 76 when a cover plate 77 is removed therefrom. An opening 78, in the housing, symmetrically disposed with respect to the opening 42, is sealed by means of a suitable cover 79.

I claim:

1. In a vehicle having mechanism adapted to be operated in the presence of matter deleterious to said mechanism, such as dust, dirt, moisture and gas, said mechanism being within a housing having an opening to the atmosphere, a member extending through said opening and connected to said mechanism, means for mounting said member for substantially reciprocatory movement to operate said mechanism; a flexible and tubular sealing structure about said movable member without said housing and exposed to the atmosphere for precluding ingress of deleterious matter into said housing, means joining one end of said sealing structure in sealing engagement with said movable member, the opposite end of said sealing structure being adapted to be held against said housing, and resilient means between said movable member and said opposite end of said sealing structure serving both to position said sealing structure and to position said movable member.

2. In a vehicle having mechanism adapted to be operated in the presence of matter deleterious to said mechanism, such as dust, dirt, moisture and gas, said mechanism being within a housing having an opening to the atmosphere, a member extending through said opening and connected to said mechanism, means for mounting said member for substantially reciprocatory movement to operate said mechanism; a flexible and tubular sealing structure about said movable member without said housing and exposed to the atmosphere for precluding ingress of said deleterious matter into said housing, means for attaching one end of said sealing structure for movement with said movable member, the other end of said sealing structure being adapted to be maintained by pressure against a wall of said housing, and spring means within and positioned between said ends of said sealing structure and protected thereby serving both to thrust said member in one direction and to thrust said other end of said sealing structure in sealing engagement against said wall.

3. In a vehicle having mechanism adapted to be operated in the presence of matter deleterious to said mechanism, such as dust, dirt, moisture and gas, said mechanism being within a housing having an opening, a member extending through said opening and connected to said mechanism, means for mounting said member for substantially reciprocatory movement to operate structure positioned about said movable member and without said housing for precluding ingress of said deleterious matter into said housing, said sealing structure comprising a cup-shaped member, means for fixedly attaching said cup-shaped member for movement with said movable member, a second cup-shaped member spaced from said first-mentioned cup-shaped member and adapted to be thrust against a wall of said housing, a spring compressed between said cup-shaped members and having ends fitting snugly therein, said spring serving to thrust said second cup-shaped member against said wall and to thrust said movable member in a direction opposite to the direction of thrust of said second cup-shaped member, and a flexible tubular sealing sleeve fastened adjacent opposite ends to said cup-shaped members to protect said spring as well as to seal the space between said cup-shaped members.

4. In a vehicle having mechanism adapted to be operated in the presence of matter deleterious to said mechanism, such as dust, dirt, moisture and gas, said mechanism being within a housing having an opening through which extends a translatory movable member connected to said mechanism for operating said mechanism; a flexible and tubular sealing structure positioned about said translatory movable member and without said housing for precluding ingress of said deleterious matter into said housing, said sealing structure comprising a cup-shaped member attached for movement with said translatory movable member, a second cup-shaped member spaced from said first-mentioned cup-shaped member and adapted to be thrust against a wall of said housing, said second cup-shaped member having an annular flange adapted to fit within said opening, a compressible sealing ring interposed between said second cup-shaped member and said wall, a spring compressed between said cup-shaped members, said spring serving to thrust said second cup-shaped member against said wall, and a flexible tubular sealing sleeve fastened adjacent opposite ends to said cup-shaped members to protect said spring as well as to seal the space between said cup-shaped members.

5. In a vehicle having mechanism adapted to be operated in the presence of matter deleterious to said mechanism, such as dust, dirt, moisture and gas, said mechanism being within a housing having an opening through which extends a translatory movable member connected to said mechanism for operating said mechanism; a flexible and tubular sealing structure including a flexible sleeve positioned about said translatory movable member and without said housing for precluding ingress of said deleterious matter into said housing, means for fixedly attaching one end of said sealing structure for movement with said translatory movable member, the other end of said sealing structure comprising an annular member fastened to an end of said flexible sleeve, said annular member having an annular flange adapted to fit within said opening and an annular plate portion at substantially right angles to said flange, and resilient means compressed within and protected by said sealing structure, said resilient means serving to thrust said annular plate portion against a wall of said housing to maintain the sealing structure in position.

6. In a vehicle having mechanism adapted to be operated in the presence of matter deleterious to said mechanism, such as dust, dirt, moisture and gas, said mechanism being within a housing having an opening through which extends a translatory movable member connected to said mechanism, a second member separable from said first-mentioned member and cooperating therewith to provide means of adjustable length for operating said mechanism, a tubular flexible sealing structure between a wall of said housing and said operating means for sealing said opening, and locking means for securing said members together and for retaining said sealing structure in position.

7. In a vehicle having mechanism adapted to be operated in the presence of matter deleterious to said mechanism, such as dust, dirt, moisture and gas, said mechanism being within a housing having an opening through which extends a translatory movable member connected to said mechanism, a second member separable from said first-mentioned member and cooperating therewith to provide means of adjustable length for operating said mechanism, a tubular flexible sealing structure between a wall of said housing and said operating means for sealing said opening, said sealing structure including rigid end elements one of which is adapted to be thrust against said wall of said housing, locking means securing said members together and engaging the other of said end elements for retaining said sealing structure in position, and spring means compressed between said end elements of the sealing structure and serving to thrust said one end element against said wall.

8. In a vehicle having mechanism adapted to be operated in the presence of matter deleterious to said mechanism, such as dust, dirt, moisture and gas, said mechanism being within a housing having an opening through which extends means for operating said mechanism, a seal structure interposed between said operating means and said housing for sealing said opening, said seal structure comprising a substantially Z-shaped end member, one flange of said end member being seated in said opening and another flange extending away from said opening, said flanges being joined by a flat plate portion adapted to be thrust toward a wall of said housing, a compressible sealing ring interposed between said wall and said plate portion, a flexible sleeve secured to the flange extending away from said opening and serving as sealing and protecting means, and resilient means enclosed and protected by said sleeve and in line with said sealing ring, said resilient means bearing against said plate portion to thrust said seal structure against said wall.

9. In a vehicle having mechanism adapted to be operated in the presence of matter deleterious to said mechanism, such as dust, dirt, moisture and gas, said mechanism being within a housing having an opening through which extends means for operating said mechanism, a unitary positionable seal structure interposed between said operating means and said housing for sealing said opening, said seal structure comprising a pair of cup-shaped end members spaced apart, a tubular and flexible sleeve secured to said end members and serving as a seal, and a spring protected by and within the sleeve and compressed between said end members, one of said end members being formed with an outwardly projecting annular flange adapted to seat freely but snugly in said opening and with a flat plate portion substantially at right angles to said flange, whereby the seal structure can be positioned as a unit with said annular flange in said opening and said plate portion against a wall of said housing.

10. In a vehicle having mechanism adapted to be operated in the presence of matter deleterious to said mechanism, such as dust, dirt, moisture and gas, said mechanism being within a housing having an opening, a member passing through said opening and connected to said mechanism, a second member having threaded engagement with said first-mentioned member and cooperating therewith to provide an operating rod for said mechanism of adjustable length, a nut threaded on said second member, a tubular flexible sealing structure about said first member, said sealing structure including rigid end elements and a flexible sleeve fastened to said end elements, one of said end elements being clamped between said nut and an abutment provided by said first member, the other of said end elements being adapted to be thrust against said housing, and spring means compressed between said end elements and enclosed by said flexible sleeve.

11. In a vehicle having brake mechanism adapted to be operated in the presence of matter deleterious to said mechanism, such as dust, dirt, moisture and gas, said mechanism being within a housing having an opening, operating means extending through said opening and connected to said mechanism, means for mounting said operating means for reciprocatory movement, movement of said means in one direction causing application of said mechanism and movement in the opposite direction being for release of said mechanism, a flexible and tubular sealing structure about said operating means and having one end in sealing engagement with said operating means, the opposite end of said tubular structure being adapted to be thrust in sealing engagement against said housing, and resilient means positioned between said tubular structure ends for thrusting said opposite end of said tubular structure against said housing and said operating means in the direction for release of said mechanism.

12. In a vehicle having brake mechanism adapted to be operated in the presence of matter deleterious to said mechanism, such as dust, dirt, moisture and gas, said mechanism being within a housing having an opening, operating means extending through said opening and connected to said mechanism, means for mounting said operating means for reciprocatory movement, movement of said means in one direction causing application of said mechanism and movement in the opposite direction being for release of said mechanism, a flexible and tubular sealing structure about said operating means and having one end in sealing engagement with said operating means, the opposite end of said tubular structure being adapted to be thrust in sealing engagement against said housing, and resilient means within and protected by said tubular structure, said resilient means being positioned between said tubular structure ends for thrusting said opposite end of said tubular structure against said housing and said operating means in the direction for release of said mechanism.

13. In a vehicle having mechanism adapted to be operated in the presence of matter deleterious to said mechanism, such as dust, dirt, moisture and gas, said mechanism being within a housing having an opening through which extends a translatory movable member connected to said mechanism, a second member separable from said first-mentioned member and cooperating therewith to provide means of adjustable length for operating said mechanism, a tubular flexible sealing structure between a wall of said housing and said operating means for sealing said opening, said sealing structure including one end adapted to be held against said wall of said housing, the opposite end of said structure terminating in a rigid element, locking means securing said members together and engaging said rigid end element for retaining said sealing structure in position, and resilient means compressed between the ends of said sealing structure and serving to thrust one end against said wall.

14. In a vehicle having mechanism adapted to be operated in the presence of matter deleterious to said mechanism, such as dust, dirt, moisture, and gas, said mechanism being within a housing having an opening through which extends movable means connected to said mechanism for operating said mechanism, said movable operating means including a plurality of elements adjustable with respect to each other to provide for adjustment of the length of said operating means, a flexible sealing structure between a wall of said housing and said movable operating means for sealing said opening, means for securing said elements together in an adjusted position and for securing one end of said sealing structure for movement with said operating means, and resilient means within said sealing structure and compressed between the ends thereof for holding the opposite end of said sealing structure against said wall of the housing.

WILLIAM H. RADFORD.

CERTIFICATE OF CORRECTION.

Patent No. 1,938,977.  December 12, 1933.

WILLIAM H. RADFORD.

It is hereby certified that error appears in the printed specification of the above numbered patent requiring correction as follows: Page 1, line 36, for the word "bet" read be; page 2, line 105, claim 3, after "operate" insert said mechanism; a flexible and tubular sealing; and page 4, line 85, claim 13, before "one" insert the word said; and that the said Letters Patent should be read with these corrections therein that the same may conform to the record of the case in the Patent Office.

Signed and sealed this 23rd day of January, A. D. 1934.

(Seal)

F. M. Hopkins
Acting Commissioner of Patents.

deleterious to said mechanism, such as dust, dirt, moisture and gas, said mechanism being within a housing having an opening, operating means extending through said opening and connected to said mechanism, means for mounting said operating means for reciprocatory movement, movement of said means in one direction causing application of said mechanism and movement in the opposite direction being for release of said mechanism, a flexible and tubular sealing structure about said operating means and having one end in sealing engagement with said operating means, the opposite end of said tubular structure being adapted to be thrust in sealing engagement against said housing, and resilient means within and protected by said tubular structure, said resilient means being positioned between said tubular structure ends for thrusting said opposite end of said tubular structure against said housing and said operating means in the direction for release of said mechanism.

13. In a vehicle having mechanism adapted to be operated in the presence of matter deleterious to said mechanism, such as dust, dirt, moisture and gas, said mechanism being within a housing having an opening through which extends a translatory movable member connected to said mechanism, a second member separable from said first-mentioned member and cooperating therewith to provide means of adjustable length for operating said mechanism, a tubular flexible sealing structure between a wall of said housing and said operating means for sealing said opening, said sealing structure including one end adapted to be held against said wall of said housing, the opposite end of said structure terminating in a rigid element, locking means securing said members together and engaging said rigid end element for retaining said sealing structure in position, and resilient means compressed between the ends of said sealing structure and serving to thrust one end against said wall.

14. In a vehicle having mechanism adapted to be operated in the presence of matter deleterious to said mechanism, such as dust, dirt, moisture, and gas, said mechanism being within a housing having an opening through which extends movable means connected to said mechanism for operating said mechanism, said movable operating means including a plurality of elements adjustable with respect to each other to provide for adjustment of the length of said operating means, a flexible sealing structure between a wall of said housing and said movable operating means for sealing said opening, means for securing said elements together in an adjusted position and for securing one end of said sealing structure for movement with said operating means, and resilient means within said sealing structure and compressed between the ends thereof for holding the opposite end of said sealing structure against said wall of the housing.

WILLIAM H. RADFORD.

CERTIFICATE OF CORRECTION.

Patent No. 1,938,977.   December 12, 1933.

WILLIAM H. RADFORD.

It is hereby certified that error appears in the printed specification of the above numbered patent requiring correction as follows: Page 1, line 36, for the word "bet" read be; page 2, line 105, claim 3, after "operate" insert said mechanism; a flexible and tubular sealing; and page 4, line 85, claim 13, before "one" insert the word said; and that the said Letters Patent should be read with these corrections therein that the same may conform to the record of the case in the Patent Office.

Signed and sealed this 23rd day of January, A. D. 1934.

(Seal)

F. M. Hopkins
Acting Commissioner of Patents.